United States Patent [19]
Broussard

[11] 3,989,143
[45] Nov. 2, 1976

[54] UPPER STRATA CHLORINATION OF UPPER SECTIONS OF CLARIFIERS

[75] Inventor: Joseph Tracy Broussard, Luling, La.

[73] Assignee: Nalco Chemical Company, Oak Brook, Ill.

[22] Filed: July 2, 1975

[21] Appl. No.: 592,591

Related U.S. Application Data

[63] Continuation-in-part of Ser. No. 488,369, July 15, 1974, abandoned.

[52] U.S. Cl. .................................... 210/62; 210/83
[51] Int. Cl.² ........................................... C02B 1/36
[58] Field of Search .............. 210/20, 62, 207, 208, 210/209, 219, 220, 221, 83

[56] References Cited
UNITED STATES PATENTS

| | | | |
|---|---|---|---|
| 495,834 | 4/1893 | Powers | 210/62 |
| 1,745,141 | 1/1930 | Baker | 210/62 |
| 1,957,303 | 5/1934 | Tietig | 210/219 X |
| 2,506,927 | 5/1950 | Kelly | 210/209 X |
| 2,901,114 | 8/1959 | Smith et al. | 210/62 X |
| 3,313,725 | 4/1967 | Tsuda et al. | 210/20 |
| 3,409,547 | 11/1968 | Dajani | 210/62 X |

OTHER PUBLICATIONS

*Sewage Treatment,* 1940, John Wiley & Sons, Inc., pp. 164, 169–177.

*Primary Examiner*—Charles N. Hart
*Assistant Examiner*—Robert H. Spitzer
*Attorney, Agent, or Firm*—John G. Premo; Robert A. Miller; Barry W. Sufrin

[57] ABSTRACT

An improved method for the introduction of chlorine into solids contact clarifiers is disclosed. The method allows treatment of effluent by chlorine but, does not allow chlorine to come into contact with the solids contact zone allowing for better coagulation by the use of water soluble polymers, while regulating microbiological surface growths effectively.

2 Claims, 2 Drawing Figures

UPPER STRATA CHLORINATION OF UPPER SECTIONS OF CLARIFIERS

This is a continuation-in-part application of Case 2661 Ser. No. 488,369 filed July 15, 1974, now abandoned.

Both municipal and industrial water clarification plants process large volumes of water annually. Industrial plants take in large volumes of raw water from rivers, streams, ponds and the like which suspended solids and organic contaminants as well as microbiological growths including algae and bacteria. Likewise, municipal water treatment plants take in considerable amounts of water from these same sources for drinking purposes and for other municipal needs. This water must be clarified to assure that it is free of suspended solids and is disinfected so as to insure that it does not contain micro-organisms which could endanger health or hinder industrial processes.

The water clarification processes which are usually used in the purification of raw water involve treating the water directly from its source in a clarifier so as to remove suspended solids and chlorination of the water so that microbiological growths are destroyed.

Due to the great interest in sanitation control, a number of procedures have been instituted to insure that the treated water is sufficiently pure so as to have the ability to serve either its industrial or municipal purpose. One particular process which has been adopted to treat raw waters is prechlorination whereby water is first chlorinated to destroy harmful bacteria and other unwanted contaminants. Usually, in such a process, the amount of chlorine added exceeds the demand by the contaminants, resulting in a residual chlorine content of from trace quantities (0.01 ppm) to 0.1 ppm to 1.0 ppm or higher. The presence of chlorine in waters which are normally clarified with organic clarifying chemicals has been found to be deleterious, especially when the organic chemicals used for clarifying water are polyamines of one type or another.

A method has now been discovered to allow the addition of chlorine to municipal and industrial raw waters in a manner so as not to interfere with organic clarifying chemicals while maintaining a safe residual chlorine level in the effluent water insuring the regulation of microbiological growth within raw water clarifiers.

The method of this invention provides to the art an economical means for the chlorination of raw water while effectively regulating microbiological growth in a type of generally used clarifier known as a solids contact clarifier. In the method of our invention, chlorine is introduced near the top and side walls of the clarifier but below the water level so as to avoid interaction of the chlorine in the solids contact zone.

The solids contact zone is the area in a clarifier into which water to be clarified is first added, and mixed, and where the action of coagulants and flocculants takes place, depositing a sludge or waste material on the bottom of the clarifier.

The prior art shows that clarifiers themselves are well known. However, the application of chlorine has usually been accomplished by adding chlorine to the influent water or close to the influent water whereby the water contained within the clarifier is uniformly treated with chlorine. It is an object of my invention to provide chlorine to the raw water contained within the clarifier only at specific points so that chlorine sensitive treating agents may be used. Among the references showing clarifiers include Kelly, U.S. Pat. No. 2,506,927 and Powers, U.S. Pat. No. 495,834.

Kelly while showing a clarifier and suggesting the addition of materials to sewage for effective control of microorganisms suggests using the central compartment or treatment zone where the influent first enters the clarifier. This will provide chlorine throughout the entire clarifier, and could if organic polymeric flocculants are used degrade these materials. Powers while showing a complicated clarifier arrangement with the water entering at the exterior and leaving towards the center, adds chlorine at the exterior. Again, so that substantially all of the water in the clarifier at any one point has a chlorine content. While it is well known to treat raw waters with chlorine so as to effectively inhibit microbiological growth, it would be an advance to the art if the chlorine could be used in combination with any number of inexpensive polymeric coagulants or flocculants which degrade readily with chlorine. It would, therefore, be an advance to the art and a great improvement for water clarification systems if chlorine could be used effectively with these organic polymeric compounds.

The method of this invention provides to the art a new and improved method for the addition of chlorine to solids contact clarifiers and permits the use of most commercially available flocculants or coagulants while using less chlorine and maintaining effective sanitation control in the clarifier.

OBJECTS

It is therefore the object of this invention to provide a new and improved method for the addition of chlorine into solids contact clarifiers.

Another object of this invention is to provide a method for the addition of chlorine into other solids contact clarifiers through the use of an orifice below the water level and near where water leaves the sludge bed.

A further object of this invention is to provide a method for the addition of chlorine into solids contact clarifiers below the water level and near the influent well whereby chlorine is not present in the solids contact zone.

Other objects will appear hereinafter.

THE DRAWINGS

Similar numerals refer to similar parts throughout the several views.

Figure 1:
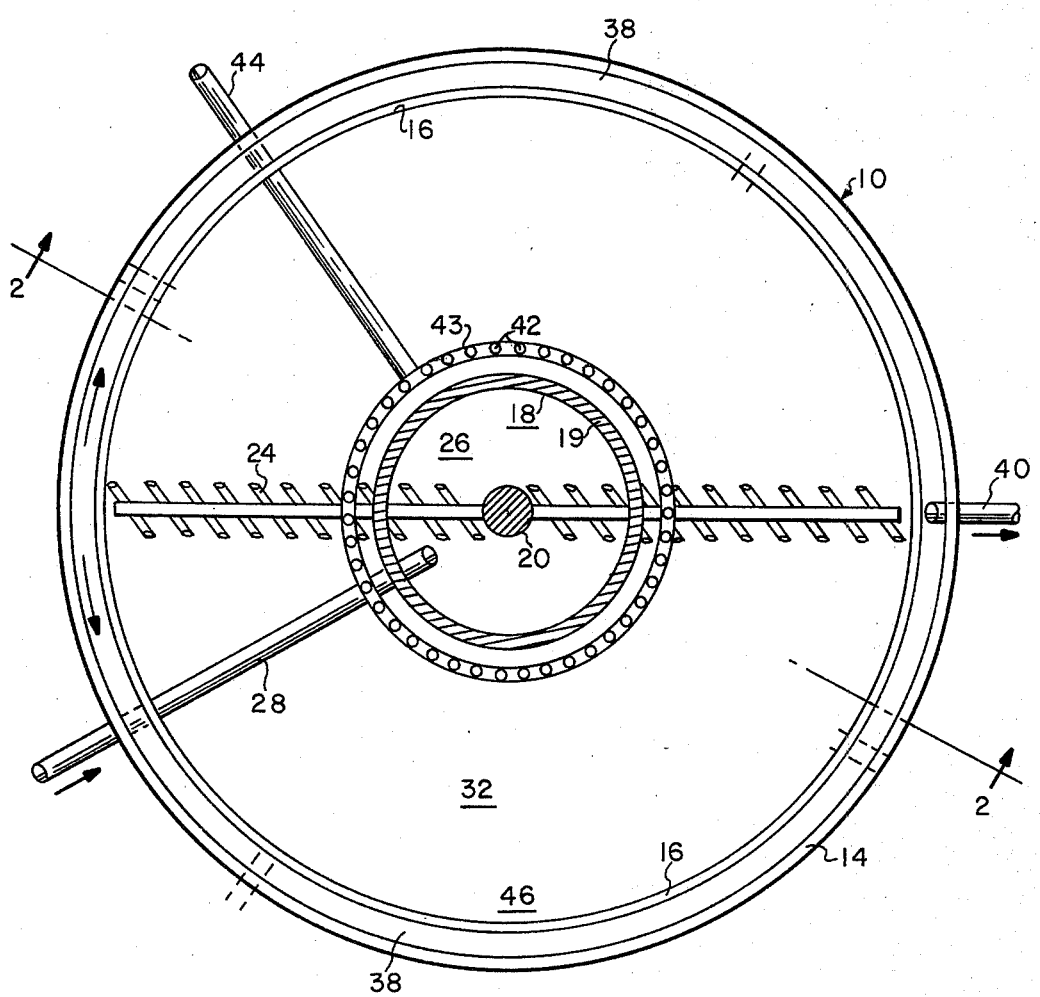
FIG. 1 is a top view of a solids contact clarifier.
Figure 2:
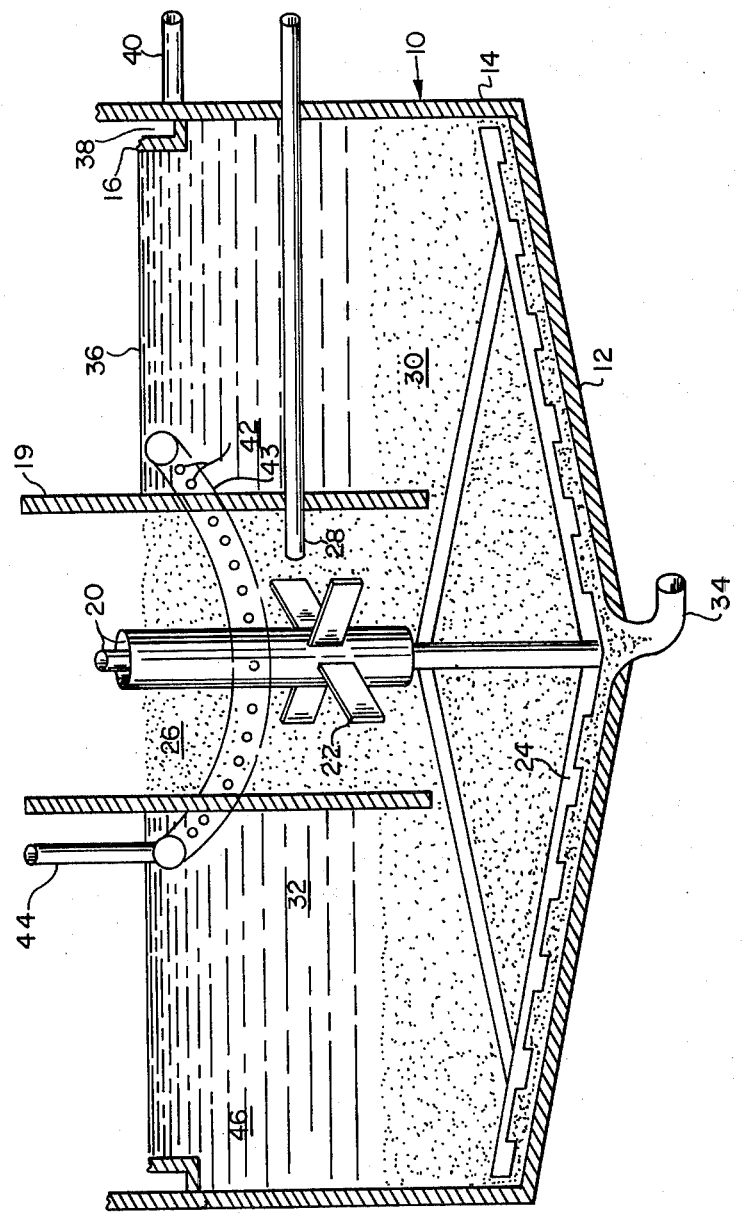
FIG. 2 is a side view taken across lines 2—2 of FIG. 1.

The solids contact clarifier is generally designated by the numeral 10. It is of conventional design having a bottom 12 and circular wall sides 14. The solid contact clarifier 10 near its top is filled with launders 16 which are parallel to and encompass the circumference of the circular wall sides 14. In the center of the solid contact clarifier 10 is an influent well 18 through which raw water 26 enters the solids contact clarifier 10. Also in the center of the clarifier attached to a rotating shaft 20 driven by conventional means not shown are an agitator 22 and sludge rakes 24. Raw water 26 enters the clarifier through an influent line 28 where it goes into the influent well 18. Due to the presence of the influent well 18, and by gravity flow, the raw water passes down through the influent well and into the sludge bed (solids contact zone) 30 covering the bottom 12.

The circular walls 19 of the influent well 18 extend downward and make contact with the sludge bed 30 so that substantially all raw water 26 passes through the sludge. The walls 19 encompassing the hollow circular influent well 18 are supported within the clarifier by a super structure anchored to the circular wall sides 14 or other suitable means outside the clarifier and is not shown. The sludge containing the raw water is mixed by sludge rakes 24, and the raw water 26 deposits suspended solid material (sludge) into the sludge bed 30. Collected sludge after it has reached a level sufficiently higher than the bottom of the influent well can be withdrawn from the clarifier through line 34.

Clarified water upon leaving the sludge bed 30, rises to the surface 36 and is drawn toward the circular wall sides 14 by gravity flow and then into the launders 16, and finally into an effluent trough 38 which empties into an effluent line 40. Chlorine is introduced through chlorine orifices 42 which are contained in circular header 43 which is adjacent to wall 19 and the outside of the influent well 18. The header 43 is below the surface 36 and is anchored to wall 19 by ordinary means. This arrangement allows sufficient contact of the chlorine with the water before the finished water 46 passes out of the clariifier 10.

In the operation of the solid contact clarifier, raw water 26 is pumped into the clarifier through influent line 28 and into influent well 18. Here it may be mixed by agitator 22 connected to rotating shaft 20 which is supported by superstructure not shown. The raw water 26 then passes down through the influent well passing through the sludge bed (solids contact zone) 30 where it is contacted with sludge, and sludge contained in the raw water is "filtered out" by sludge bed 30. Clarified water 32 rises to the surface 36 outside of the influent well. On nearing the surface 30, the water is subjected to treatment with chlorine by means of an aqueous solution delivered through the chlorine orifices 42 found in header 43 which is fed by feed pipe 44 which extends to a source of chlorine not shown.

The aqueous solution containing the chlorine being fed to the chlorine orifice by feed pipe 44. The chlorine even when mixed with clarified water 32 does not make contact with the water still within the influent well or the water contacting the sludge 30. After treatment with chlorine, the now finished water 46 proceeds through the launders 16 into the effluent trough 38 and into the effluent line 40 for softening, further treatment or use.

I prefer to carry out my invention through the use of one or more chlorine orifices 42 which dispense chlorine into the clarified water 32 as shown. Shown in the drawing is a circular header mechanism 43 containing chlorine orifices 42 which are fed chlorine by feed pipe 44 for the addition of chlorine to the clarified water 32. The circular header 43 containing the chlorine orifices 42 will have a slightly larger circumference than walls 19, thus maintaining a parallel space relationship. While one embodiment is specifically shown in the drawings it will be readily apparent to those skilled in the art that other methods of chlorine introduction, either as an aqueous solution or as a gas will perform in the course of my invention. Examples of suitable methods of chlorine addition to clarifiers of the type described include placing headers containing orifices for chlorine at points at or around the exterior of the influent well so that chlorine will not be present in water which still contains solid matter, but is present in water which has had the solids removed, and thus will require a lower chlorine demand.

It is not essential whether an aqueous solution of chlorine or chlorine gas itself is used in this invention. What is important, however, is that chlorine, once introduced does not make contact with water in the influent well 18 or the sludge bed 30, but only with water that has been clarified 32 and has risen to the surface 36 so that chlorine is present in the water on the top of the clarifier 10 and slightly below the surface 36 of the clarified water 32. In this way the oxidizing effect of chlorine on coagulants or flocculants which may have been introduced into the influent well 18 cannot take place, thus saving a considerable volume of chlorine which would have been consumed by oxidizable matter in the raw water 26 which has been removed as sludge 30 by the action of the clarifier 10.

Also, since chlorine is being introduced into the clarifier, and is present near the surface of the water 36, effective regulation of microbiological growth and algae is maintained at the surface of the clarifier 36. This keeps surface growths from forming and thus allows sunlight to penetrate the finished water 46 helping to prevent septic conditions from developing within the clarifier.

While a circular solid contact clarifiier 10 is shown having launders 16 adjacent to the wall sides 14, my invention will also function properly with solid contact clarifiers of any design and shape providing chlorine is introduced to the clarified water after it has passed out of the sludge bed and before it has been discharged from the clarifier. Included in the designs which my invention will perform adequately are square or rectangular contact clarifiers and circular solids contact clarifiers having launders and wiers extending radially from the center of the clarifier and emptying near the circular side walls. Furthermore, chlorine orifices 42 contained in header 43 should be spaced around the perimeter of the wall 19 and yet be outside of the influent well 18 so that substantially all clarified water 32 leaving the sludge blanket 30 is treated with chlorine before its passage out of the clarifier through launders 16 into the effluent trough 38 and out of the clarifier through effluent line 40.

The organic flocculants or coagulants used to settle suspended solids out of the raw waters taken in for treatment are typically either cationically or anionically charged polymers. Typically, chlorine will attack many of the commerically available cationic polyamine flocculants and likewise it will attack many of the commerically available anionic acrylamide based polymers with a substantial lowering of molecular weight and hence a loss of activity in these processes. With the use of my invention, chlorine will not be in contact with the flocculants or coagulant used, and therefore, less polymer need be added to the system to achieve the desired clarification effect. Furthermore, since chlorine is not present in the solids contact zone polymers which are not chlorine resistant and are oftentimes cheaper may be used satisfactorily in place of the more expensive chlorine resitant variety. Also, since it has been recently shown that chlorine when added to water containing organic impurities may interact to form certain chlorinated hydrocarbons which may be carcinogens, the method of my invention provides a measure of public safety in that since less chlorine is being consumed to purify a known volume of water, the chance of chlorine interacting with organic contaminants is greatly reduced. It is thus seen that with the use of my invention a cost savings is achieved by the use of less chlorine, certain chemical additives used for clarifying water may be used with my invention where they could not be with conventional chlorination techniques, and that furthermore a benefit to public health may arise with the use of my invention. It is further pointed out that like conventional chlorination techniques where the chlorine is introduced into the waste water stream as it enters the clarifier, the chlorine which I add in my invention is added essentially to the water leaving the clarifier although sufficient chlorine is maintained at the top and near the exterior sides of the clarifier so as to prevent septic conditions from forming.

The quantity of reducing substances, both organic and inorganic, in raw water varies, so that the amount of chlorine that has to be added to this water for disinfectant purposes will vary. The chlorine used by these organic and inorganic reducing substances is defined as the chlorine demand. It is equal to the amount of chlorine added minus the remaining chlorine as combined chlorine after a period of time, which is generally 15 minutes. Disinfection is caused only by that amount remaining after the chlorine demand has been satisfied. This quantity of chlorine in excess of the chlorine demand is defined as residual chlorine and expressed as parts per million.

In order to further illustrate my invention, the following are procedures that would be followed when using this method of chlorine introduction in a solids contact clarifier:

EXAMPLE 1

A clarifier containing raw water with a chlorine demand of 7.0 parts per million after leaving the zone of contact has added to it, through chlorine orifices below the surface of the water and near the exterior of the influent well 7.5 ppm chlorine as an aqueous solution. The resulting effluent will have a chlorine residual of 0.5 ppm.

EXAMPLE 2

Raw water which would have a total chlorine demand of 9.0 ppm and contain suspended solids would be added to the solids contact clarifier along with 7 ppm of an ammonia ethylene dichloride condensation polymer of an average molecular weight of 7,000 which would be allowed to interact with the water in the zone of contact. Water reaching the surface of the clarifier would have a chlorine demand of 5 ppm due to the removal of solid material and the chlorine demand of the solids which had been settled out. 5.5 ppm of chlorine would then be added to the effluent water before reaching the launders by the addition of an aqueous solution of chlorine through chlorine orifices below the surface of the water and on the exterior of the influent well. Effluent going over the wiers and into the effluent trough would have a residual chlorine contact of 0.5 ppm. Algae and microbiological growths would not form on the surface of the water within the solids contact clarifier due to the presence of chlorine at or near the surface of the water. Chlorine demand would also be lower due to the fact that no chlorine is consumed due to the oxidation of the high molecular weight polyamine coagulant.

I claim:

1. An improved method for the introduction of chlorine into solids contact clarifiers for treating raw waters of the type which comprises a clarifier basin having walls, a means for the introduction of influent near the center of the basin, a means for stirring influent, a solids contact zone, a means for depositing sludge removed from the influent on the bottom of the basin, and a means for removing clarified water over the top of said walls said improvement comprising: the addition of chlorine to the water contained within the clarifier basin through orifices located below the surface of the water and at or near the top level of the water in the clarifier being substantially above the solids contact zone whereby chlorine is not present in the solids contact zone and chlorine is present at and slightly below the surface of the water, said method further characterized as maintaining a residual chlorine content of from 0.1–1.0 ppm in the effluent water from said clarifier, and maintaining sufficient chlorine at the top and near the walls of said clarifier so as to prevent septic conditions from forming.

2. An improved method for the introduction of chlorine into solids contact clarifiers for treating raw waters of the type which comprise a clarifier basin having exterior walls, a means for the introduction of raw influent near the bottom and center of the basin, a means for stirring influent, a solids contact zone, a means for depositing sludge removed from the influent on the bottom of the basin, and a means for removing clarified water over the top of said walls said improvement comprising: the introduction of chlorine at or near the exterior walls of said solids contact clarifier and adjacent to water being removed from the clarifier, above the solids contact zone whereby chlorine is not present in the solids contact zone, and chlorine is present at and slightly below the surface of the water and in the effluent water from the clarifier, said method further characterized as maintaining a residual chlorine content of from 0.1–1.0 ppm in the effluent water from said clarifier, and maintaining sufficient chlorine at the top and near the walls of said clarifier so as to prevent septic conditions from forming.

* * * * *